(12) United States Patent
Eakle, Jr. et al.

(10) Patent No.: US 6,549,845 B2
(45) Date of Patent: Apr. 15, 2003

(54) DEAD RECKONING PEDOMETER

(75) Inventors: Robert F. Eakle, Jr., Aiken, SC (US); Kenneth J. Hofstetter, Aiken, SC (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

(21) Appl. No.: 09/757,560

(22) Filed: Jan. 10, 2001

(65) Prior Publication Data

US 2002/0091482 A1 Jul. 11, 2002

(51) Int. Cl.⁷ .................................................. G06G 7/00
(52) U.S. Cl. ........................ 701/207; 600/595; 600/587
(58) Field of Search ................................ 701/200, 207, 701/208, 216, 217; 600/595, 587

(56) References Cited

U.S. PATENT DOCUMENTS

| | | | |
|---|---|---|---|
| 5,075,693 A | | 12/1991 | McMillan et al. .......... 342/457 |
| 5,583,776 A | | 12/1996 | Levi et al. .................. 701/217 |
| 5,724,265 A | | 3/1998 | Hutchings ................... 702/141 |
| 5,744,953 A | * | 4/1998 | Hansen ................... 324/207.17 |
| 5,764,014 A | | 6/1998 | Jakeway et al. ............ 318/587 |
| 6,032,108 A | * | 2/2000 | Seiple et al. ................ 702/97 |
| 6,132,391 A | * | 10/2000 | Onari et al. ................ 600/595 |

* cited by examiner

Primary Examiner—William A. Cuchlinski, Jr.
Assistant Examiner—Marthe Y. Marc-Coleman
(74) Attorney, Agent, or Firm—J. Herbert O'Toole; Nexsen Pruet Jacobs & Pollard, LLC

(57) ABSTRACT

A system to determine the location of a person within a structure utilizes a magnetometer, magnets, pressure sensors and a CPU to calculate the length and direction of each step. The data may be displayed to the wearer, preferably on a map or floorplan and may be broadcast to persons outside the structure.

10 Claims, 3 Drawing Sheets

DEAD RECKONING PEDOMETER

This invention was made with government support under contract DE-AC09-96SR18500 awarded by the U.S. Department of Energy to Westinghouse Savannah River Company and the government has certain rights in this invention.

BACKGROUND

1. Field of the Invention

This invention relates generally to the determination of the location of an individual based upon data collected from magnetometers placed in the podiatric region and more particularly to determining the location of a person or robot in a space lacking benchmarks.

2. Background and Prior Art

The determination of a person's exact location has been a challenge throughout history.

Landmarks in the form of the rivers and mountains sufficed for primitive societies. Highway markers resolved the task for later travelers. Celestial navigation based on the sextant and accurate chronometers made possible marine navigation. All of these methods rely upon fixed points of reference and the person defines his location by reference to the location of the fixed reference point.

A more difficult problem is posed when the only fixed reference point is the point of departure. The problem is raised when a person or a robot must enter a closed location without interior reference points or when the person or robot cannot communicate the relationship to reference points to persons outside the location.

Examples of this condition are rescue persons entering a burning building or robots entering a damaged nuclear reactor.

Pedometers based upon counting the number of steps taken are well known but cannot define direction and must be calibrated for a person's stride. Electronic pedometers such as that disclosed in U.S. Pat. No. 5,724,265 to Hutchings use accelerometers and rotational sensors together with a small computer to calculate speed, distance, etc.

Dead-reckoning devices for vehicles using multiple sensors to determine speed and heading are disclosed in U.S. Pat. No. 5,075,693 to McMillan et al. and U.S. Pat. No. 5,764,014 to Jakeway et al. These devices measure distance from wheel rotation, ground track sensors and obtain direction using a magnetometer. Problems with systemic and non-systemic errors in such systems are described in University of Michigan Technical Report UM-MEAM-94-22 by Borenstein and Feng.

A dead-reckoning system for pedestrians is disclosed in U.S. Pat. No. 5,583,776 to Levi et al. and uses an accelerometer to measure footsteps. The device is calibrated for the user and the results routinely corrected using data from a GPS receiver. Indoor use would preclude use of GPS and be subject to the same (or worse) errors as described by Bornstein et al.

Magnetometers are instruments used to measure magnetic fields. Particularly useful for navigation are flux-gate or flux-valve magnetometers which find use in compasses and avionics. Using the magnetic poles of the earth, a three-axis magnetometer can detect direction, pitch and yaw in an aircraft. The development of microelectronic processing elements renders information from magnetometers immediately useful and more accurate.

BRIEF SUMMARY OF THE INVENTION

It is a first object of this invention to provide a means for measuring the movement of a person in a space lacking good reference points. It is a second object of this invention to provide a means for advising a person of his location relative to a starting point. It is a third object of this invention to provide a record of a person's movement. It is a fourth object of this invention to provide a means for others to monitor the position of a person within an enclosure when visible reference points are limited or non-existent.

These and other objectives are obtained by attaching small magnets to a person's feet and monitoring the movement of these magnets using 3-dimensional magnetometers in conjunction with a computerized monitoring system. The results may be displayed for the user or communicated to persons at a distance. By use of this invention, firefighters in burning buildings can be located and workers in other maze-like settings may be followed.

DETAILED DESCRIPTION OF THE INVENTION

The dead reckoning pedometer according to this invention has two elements. A sensing package is mounted at or near each foot and consists of a magnetic point source, a three-dimensional magnetic sensor and a foot pressure sensor.

The processing package, which may be mounted at the waist, in a back or front pack or in an article of clothing such as a turn-out coat, consists of a computer processing unit including to but not limited to a signal conditioning unit, computer, data bases such as a floor plan, a display screen and a transmitter.

As a separate component, a remote unit such as a radio receiver, display, databases and CPU may be used to follow the person from outside the facility. For example, one or more floorplans or architectural drawings may be stored and the location of the wearer placed on the floorplan using three-dimensional CAD programs commercially available.

Additional sensors may be interfaced to the CPU carried by the person or may be external, fixed sensors within a facility to assist with location determination. A firefighter, for example, might carry one or more of a temperature sensor, oxygen sensor, flammable gas sensor or oxygen flow sensor. External sensors may include motion sensors, microphones, thermoanaemometers, etc.

Figure 1:
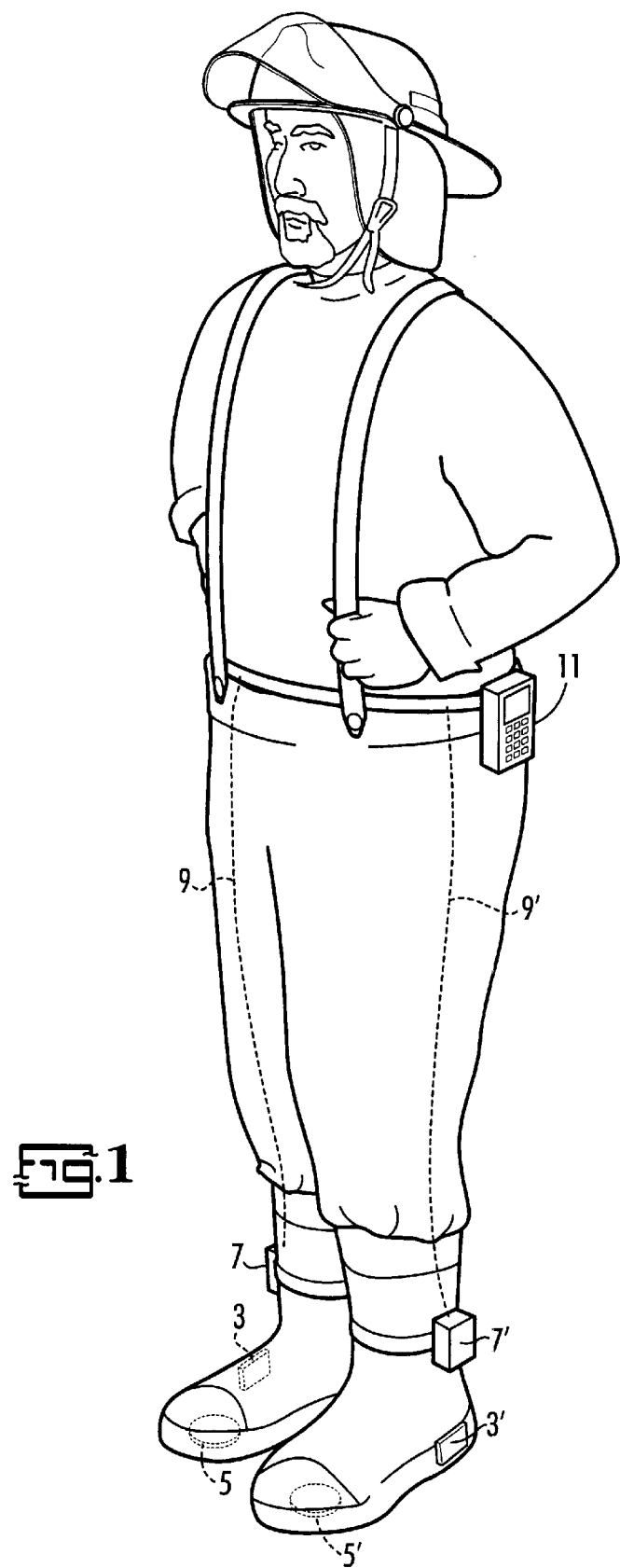
FIG. 1 illustrates a person wearing the components of this invention.

FIG. 1 illustrates the invention in terms of a fireman. At or near each foot are placed a magnet 3, 3' which may be a permanent magnet or an electromagnet. A pressure sensor (pressure switch) 5, 5' is mounted in such a location so as to register when that foot is brought into or out of contact with the floor. A magnetometer 7, 7' is mounted on each extremity to detect movement of the foot-carried magnets. Wires 9, 9' are run from the feet to the signal conditioning unit 11.

Most rescue personnel wear a type of boot which can be easily adapted to be the sensing element of the invention. A firefighter's boots could easily be modified to carry the necessary items and sensing cables easily connected to a belt mounted unit or to the turn-out coat to isolate them from heat and snagging.

Figure 2:
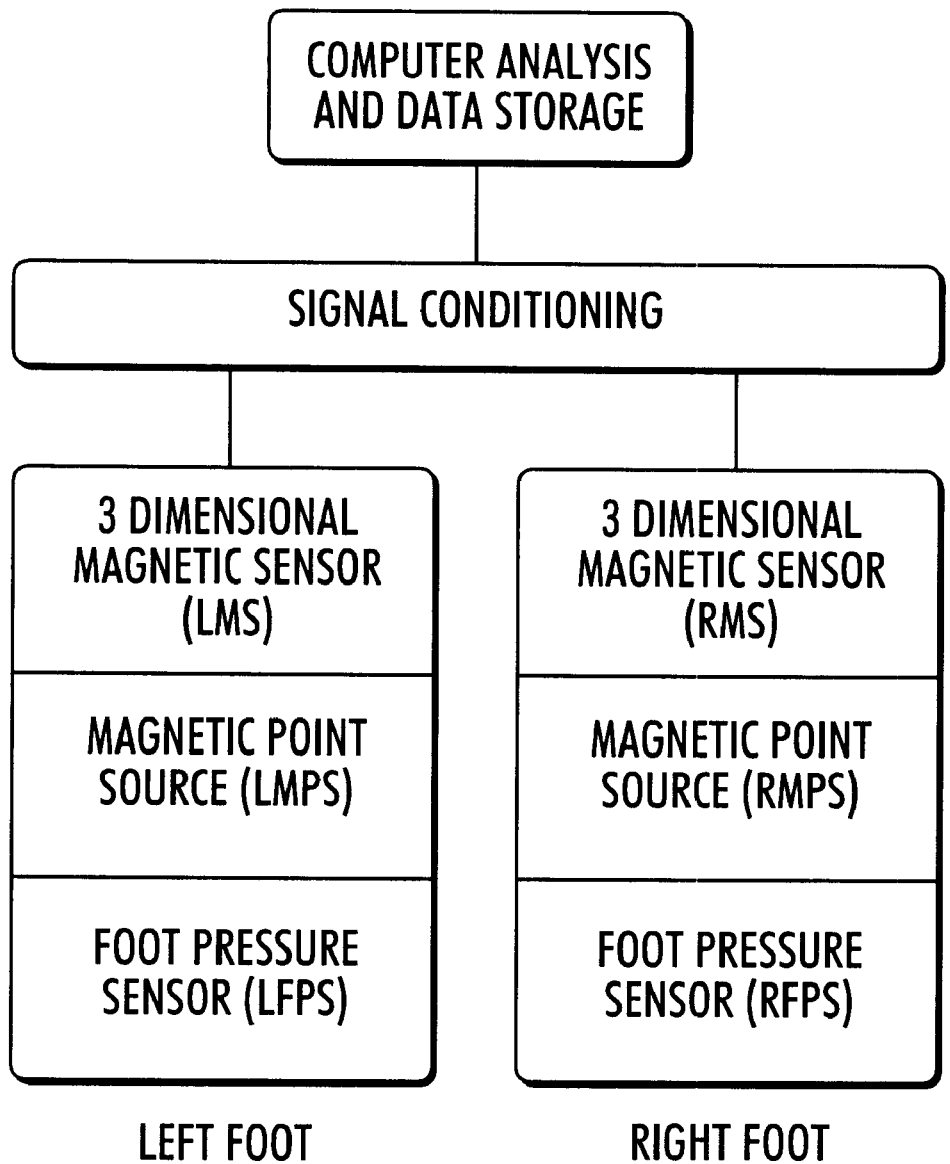
FIG. 2 is a block diagram showing the basic system components and logic of a first embodiment of the invention.

The basic signals for processing as shown in FIG. 2 would be on or off for each foot pressure sensor and x, y, and z readings as interpreted from changes in the magnetic field strength from the magnetomer.

Signal conditioning would include one or more of the following operations: a) analog to the digital conversion (ADC); b) high speed signal samples; c) data logger; central processing unit for analysis of data; d) mass storage device; and e) transmitter.

The output from the magnetometer consists of relative magnetic field strength in the x, y and z directions during each step.

Outputs are three-dimensional analog signals (voltages) which are converted to digital intensities by ADC in each direction and time unit.

Each permanent magnet has a known field strength which falls off with distance from the magnetometer. Since we are encompassed in the earth's magnetic field, we can get the relative components in the x, y, z directions for each step.

Commercial magnetometers suitable for use in this invention are the HMC 1000 series from Honeywell. The magnetometers should be calibrated for the magnets used.

The output of each magnetometer begins when the pressure sensor switch on the opposite foot is released and stops when the pressure sensor switch of the opposite foot is activated.

The relative position of each foot is determined by sampling the changes in magnetic field in the x, y and z direction during the step. At the completion of the step the new (X, Y, Z) position is established as a bread crumb trail.

Beginning at an arbitrary reference point, e.g., a door, the position of each foot can be related back to the reference point. The frequency of each stride is determined by equation (1)

$$t_{stop} - t_{start} = \text{frequency of stride} \quad (1)$$

The length of the stride is determined by equation (2)

$$H_{stop} - H_{start} = \text{length of stride} \quad (2)$$

wherein H is the average magnetic flux in Webers. The direction is obtained by subtracting the magnetic flux of the earth from the sensed average flux.

The distance traveled is obtained by equation (3)

$$D = (X_1 - X_0)^2 + (Y_1 - Y_0)^2 + (Z_1 - Z_0)^2 \quad (3)$$

where X, Y and Z are the distances from the starting point in each direction.

Figure 3:
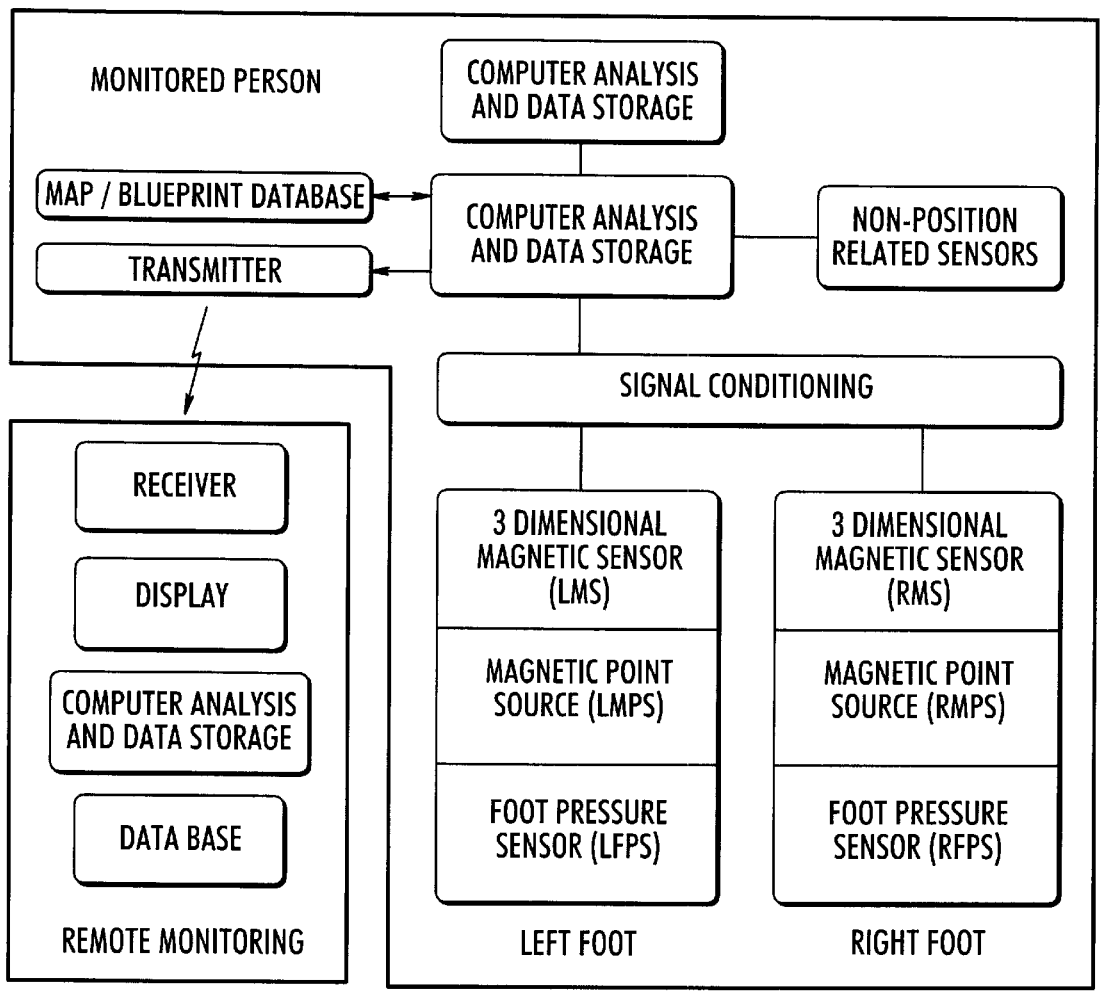
FIG. 3 is a block diagram showing the basic system components and logic of a second embodiment of the invention.

In a second embodiment, as shown in FIG. 3, the movement can be overlayed onto a digitized map such as a blueprint on three-dimensional drawing (CAD) to show the wearer his position. This is best done by display. A simple liquid crystal screen may suffice. For smoky locations, an heads-up display onto a visor may be preferred. Known reference points within the field also could be displayed.

The information collected by the wearer also may be transmitted remotely using conventional radio frequency signals. Persons outside the confined space could follow the progress of the wearer and provide directions as appropriate.

Other aspects, objects and advantages of this invention may be obtained from a study of the drawings, the disclosure and the appended claims.

We claim:

1. A dead reckoning pedometer comprising:
   a) a foot pressure sensor attached to each front;
   b) a magnetic point source attached at or near each foot;
   c) a magnetometer attached at or near each foot;
   d) a signal conditioning unit to process signals from each sensor and each magnetometer;
   e) a computer analysis and data storage unit;
   f) means for displaying the results from said computer analysis.

2. A dead reckoning pedometer according to claim 1 further comprising a database containing floorplans.

3. A dead reckoning pedometer according to claim 1 further comprising a radio frequency transmitter.

4. A dead reckoning pedometer according to claim 1 wherein said means for displaying said result is a liquid crystal screen.

5. A dead reckoning pedometer according to claim 1 wherein said means for displaying said result is a heads-up display.

6. A method for determining the location of a person using a dead reckoning pedometer comprising:
   a) means for determining when each foot is in contact with a supporting surface;
   b) means for determining the position of permanent magnets;
   c) means to calculate the position of said permanent magnets relative to a previous position.

7. A method according to claim 6 wherein said means for determining when each foot is in contact with a supporting surface is a pressure sensor.

8. A method according to claim 6 wherein said means for determining the position of permanent magnets is a magnetometer.

9. A method according to claim 6 wherein said means for calculating is a signal conditioning unit and a CPU.

10. A method according to claim 9 further comprising displaying the results from said calculating on a map.

* * * * *